United States Patent [19]

Eckland

[11] 4,326,498
[45] Apr. 27, 1982

[54] SOLAR CANAL

[76] Inventor: John E. Eckland, 600 Walker Hill La., Great Falls, Va. 22066

[21] Appl. No.: 204,186

[22] Filed: Nov. 5, 1980

[51] Int. Cl.³ .............................................. F24J 3/02
[52] U.S. Cl. ..................................... 126/415; 4/498; 126/438
[58] Field of Search ................... 4/498, 503; 126/415, 126/416, 426, 450, 438, 439

[56] References Cited

U.S. PATENT DOCUMENTS

| | | | |
|---|---|---|---|
| 3,161,193 | 12/1964 | Rowekamp | 126/415 |
| 4,108,156 | 8/1978 | Sitter | 126/415 |
| 4,138,992 | 2/1979 | Shaffer | 126/415 |
| 4,214,572 | 7/1980 | Gonder | 126/415 |
| 4,226,530 | 5/1981 | Steadman | 126/438 |
| 4,227,511 | 10/1980 | Margen et al. | 126/415 |
| 4,235,221 | 11/1980 | Murphy | 126/415 |
| 4,249,518 | 2/1981 | Holt | 126/415 |
| 4,270,232 | 6/1981 | Ballew | 4/498 |
| 4,283,913 | 8/1981 | Loeb | 126/415 |
| 4,284,060 | 8/1981 | McCluskey | 4/498 |
| 4,289,112 | 9/1981 | Roseen | 126/415 |

OTHER PUBLICATIONS

S. L. Sargent, U.S. Dept. of Energy, SERI Site Office, Golden, Colo. 80401, "An Overview of Solar Pond Technology".

Aden B. and Marjorie P. Meinel, *Applied Solar Energy*, 1976, pp. 457-459, 582-583.

*Primary Examiner*—Daniel J. O'Connor
*Attorney, Agent, or Firm*—Arnold, White & Durkee

[57] ABSTRACT

This invention relates generally to a device for the collection of solar energy and the production and storage of heat for industrial processes, space heating, cooling and other processes where heat of up to approximately 100° C. is required. A solar canal to collect and store solar energy comprising a covered solar pond which provides an essentially airtight environment for the fluid of the solar pond is disclosed. A nonconvecting solar pond, particularly a saline gradient pond, is preferred.

3 Claims, 5 Drawing Figures

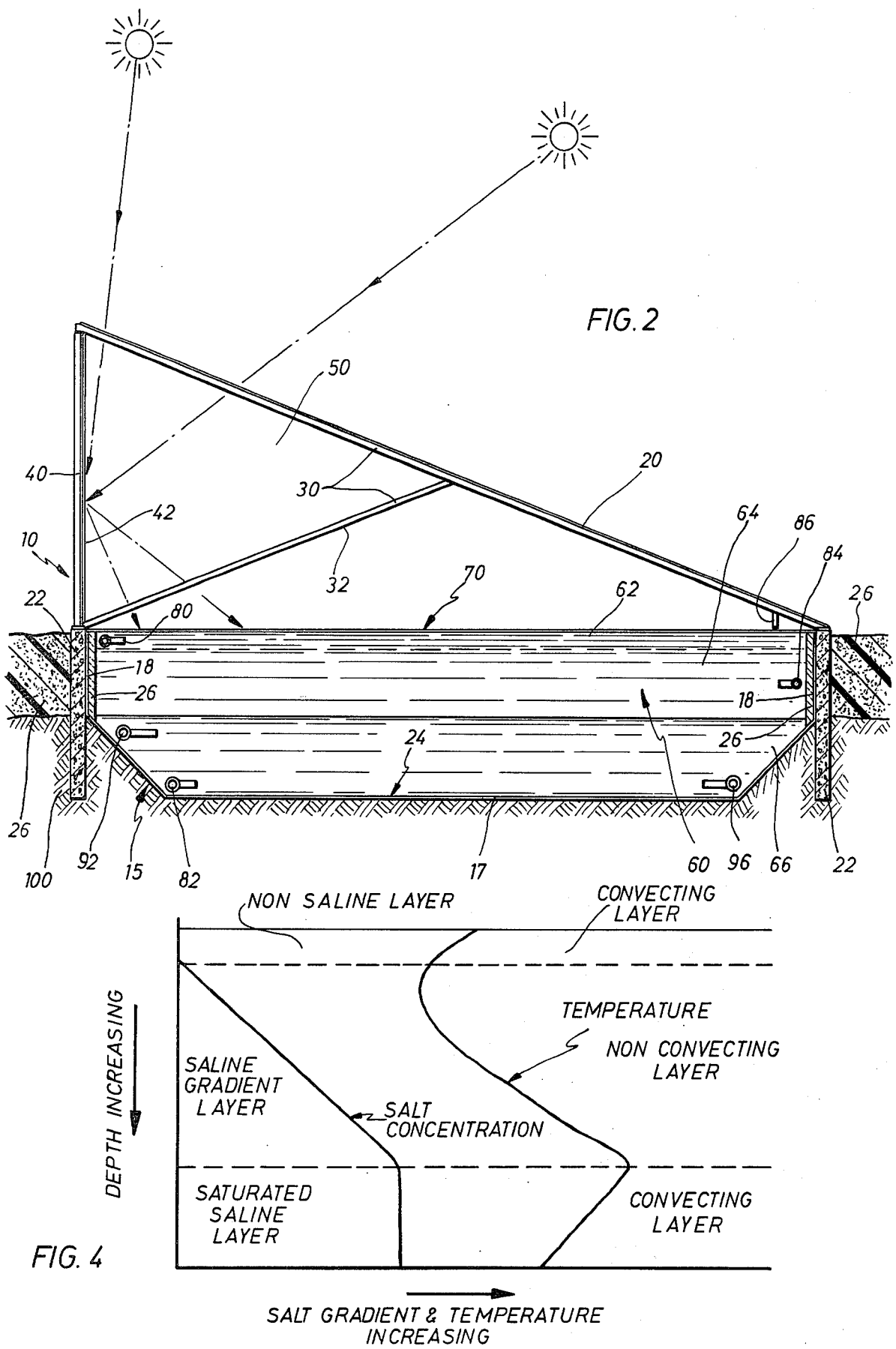

SOLAR CANAL

BACKGROUND OF THE INVENTION

1. Field of the Invention

This invention relates generally to a device for the collection of solar energy and the production and storage of heat for industrial processes, space heating cooling and other processes where heat of up to approximately 100° C. is required. More particularly, a device to collect and store solar energy comprising a covered solar pond and preferably a non-convecting covered solar pond is disclosed.

2. Description of the Prior Art

Much interest exists in means for collecting and storing solar energy. Of particular interest have been means of producing industrial heat process water. Solar water heating is often ideal for these purposes which require water typically in the 50° C. to 80° C. range.

The term "solar pond" has been used to indicate a device in which water plays a significant role in both the collection and storage of solar energy. Although it is theoretically possible to use other fluids, water because of its abundance and usefulness is generally preferred. Such solar ponds are attractive because they are inexpensive to construct and operate.

Solar ponds generally comprise a large, shallow (1-3 meters in depth) pond filled with water. The water is heated by solar insolation. Solar radiation may be absorbed either directly by the water or indirectly by dark, absorbing surfaces forming the bottom and sides of the solar pond. The water in solar ponds is stationary and does not flow as in flow-through or trickle collectors. The heated water in the solar pond also provides thermal storage which is available to average daily and seasonal variations in solar insolation.

Solar ponds may be of two types. The "shallow solar pond" is generally filled with fresh water which is convecting.

The "non-convecting solar pond" may be of several subtypes. Generally a non-convecting pond is produced by the use of a fluid employing a salt gradient. This type of pond comprises three distinct layers: the surface convecting layer, the non-convecting middle layer and the bottom convecting storage layer. Solar radiation is absorbed both within the pond liquid and at the pond bottom, which is usually dark colored. The bottom convecting storage layer contains the fluid with the highest concentration of salt. The lowest concentration of salt is found in the surface convecting layer. A non-convecting layer comprising a fluid exhibiting a salt or concentration gradient wherein the concentration increases with depth is found therebetween. The mass density gradient created by this salt concentration gradient offsets the thermal density gradient created by the hotter water near the bottom of the pond and prevents thermal convection. The non-convecting salt gradient layer acts both as an insulator for the convecting layer at the bottom and as a thermal storage means. Both external and internal heat exchangers to extract heat from such ponds have been employed.

A variant of the salt gradient pond is the saturated salt gradient pond. Such a pond uses a salt whose solubility increases significantly with increasing temperature. A saturated solution of such a salt is maintained throughout all depths of the pond. The difference in solubility with respect to temperature insures that the solution increases in concentration at increasing depths.

Non-convecting solar ponds may also be produced by the addition of various substances which increase the viscosity of the pond fluid to the point where convection is suppressed. Commercial gelling and thickening agents may be used to produce such ponds. Such ponds have been described in U.S. Pat. No. 4,138,992.

Transparent membranes may be inserted either horizontally or vertically into a pond to suppress convection.

Saltless convecting ponds, lacking a salt gradient layer, have also been employed. These ponds must be protected from thermal loss by transparent covers and/or additional night insulation. Floating microglass beads, inflated multiple plastic film glazings, liquid foam, side and bottom insulation or closable lids have been used for this purpose.

A summary of solar pond technology may be found in "An Overview of Solar Pond Technology" by S. L. Sargent, U.S. Dept. of Energy, SERI Site Office, Golden, Colo. 80401.

Many problems are associated with the above solar ponds. The efficiency of such systems has been estimated to be less than about 15%, and generally only about 8%. Further, such ponds are able to provide reliable and steady supplies of heat only under certain conditions.

Salt gradient ponds exhibit additional problems. Evaporation losses from the surface require the addition of fresh water or solutions of minimal salinity. Maintenance of the salt gradient often requires the removal and disposal of highly saline effluent from the pond bottom. This removal and disposal, together with the possible leakage of the saline solution from the pond, often produces contamination problems. These problems may involve surface contamination or contamination of underground aquifers.

The uncovered nature of such ponds also presents many problems. The pond is susceptible to contamination by wind blown debris. Wind stirring also complicates pond management by creating wave action which mixes the graduated solution, reduces the collection of heat and increases evaporation losses.

Algal and other bacterial growth may also reduce the pond clarity and the collection of solar energy. Other problems arise from outgassing of the pond bottom and leakage of the saline solution into local aquifers. Further, such solar ponds are horizontal collectors, reaching a maximum efficiency in summer and exhibiting a minimum efficiency in winter, rather than providing a constant supply of solar energy.

SUMMARY OF THE INVENTION

The present invention overcomes the disadvantages of the prior art by a very simple, yet efficient solar canal. This solar canal preferably comprises an enclosed solar pond, employing a rigid cover plate and optionally a thin covering material placed on the fluid surface to retain the fluid in an essentially airtight environment. The solar canal of the present invention overcomes many of the disadvantages of solar ponds discussed above.

The solar canal of the present invention is used for the collection and storage of solar energy. Such a solar canal comprises a fluid filled collection and storage pond with a rigid cover plate covering the pond to retain the fluid in an essentially airtight environment.

This cover plate which is transparent or translucent to solar radiation and preferably opaque to thermal infrared radiation isolates the pond fluid, thus eliminating many of the problems associated with prior art solar ponds.

A covering material may optionally be placed between the rigid cover plate and the fluid and in contact with the surface of the fluid. The use of the covering material in contact with the surface of the fluid provides additional insulation by isolating the air under the rigid cover plate from the fluid. This film is also transparent or translucent to solar radiation and preferably opaque to thermal infrared radiation.

Water and heat loss through evaporation from the surface of the fluid are eliminated. Problems of algal growth are eliminated by this isolation from the atmosphere and the removal of an oxygen source. Problems associated with wind and wave stirring, such as increased evaporation, decreased clarity due to wind blown debris and destruction of the salt gradient due to stirring and mixing are eliminated by the rigid cover plate. The production of an isolated fluid system provides for simplified and possibly automatic management of the saline gradient.

The isolated fluid solar canal of the present invention may be used with both convecting and non-convecting solar ponds. Non-convecting solar ponds may be established using salt gradient solutions, saturated salt gradient solutions, gel or other viscosity thickening fluids or horizontal or vertical membrane systems.

Another feature of the solar canal is the use of a dark, absorbing liner for the solar pond. Advantages associated with such a liner include additional indirect heating of the fluid by increased solar absorption in the liner and the elimination of leakage of the fluid from the solar pond. Such leakage elimination is particularly desirable when salt gradient ponds are employed.

An additional feature of the solar canal of the present invention is a means for supporting the rigid cover plate at an angle to the surface of the fluid so as to optimize the solar insolation. This means may be provided by a rigid support wall located on the side of the pond farthest from the equator. This rigid support wall preferably is reflective on its side adjacent to the solar pond. The support wall supports the rigid cover plate covering the solar pond.

Several advantages are obtained by the use of such a support wall and cover plate. Such a triangular construction is very strong, permitting the use of lightweight supporting materials. Such a construction permits automatic maintenance of the upper convecting layer by providing a means for evaporated fluid to condense on the lower side of the cover plate and naturally re-enter the fluid layer by a drip ledge at the lower end of the rigid cover plate. Such a system minimizes the problems associated with seasonality in heat collection, producing a solar pond which is less effected by the seasonal location of the sun. Further, such a construction provides protection for the thin film and surface of the solar pond from wind blown debris and wind or wave action.

Additionally, such a construction provides added insulation for the solar pond, producing a large dead air volume between the rigid cover plate and thin film on the surface of the solar pond. This large dead air volume provides insulation to maintain the temperature of the solar pond during times of low solar radiation. A segmented and movable rigid cover plate and support system may also be employed to further increase solar radiation absorption by providing additional reflective surfaces and by adjusting the angle of the rigid cover plate to account for the position of the sun.

In some climates and with some solar conditions additional insulation along the walls and bottom of the solar pond may be required. This insulation, if provided by a dark, absorbing waterproof material, may serve the dual purpose of providing insulation and a dark, absorbing waterproof liner for the solar pond.

An additional feature of the solar canal of the present invention is the inclusion of means for maintaining the salt gradient in salt gradient ponds. Any suitable means may be employed whereby small volumes of highly concentrated solution and of minimally concentrated solution are added respectively to the bottom and top of the pond while equal volumes of medium concentrated solution are withdrawn near the midpoint of the depth of the pond. Since evaporation and leakage losses are very low with the solar canal of the present invention, little maintenance of the salt gradient is necessary. Automatic maintenance is thus possible, as, e.g., the use of a drip ledge to automatically add condensate to the upper convecting layer.

A further feature of the solar canal of the present invention is the inclusion of means for extracting heat from the solar pond. This means may take the form of heat exchange means located near the bottom of the solar pond to extract heat from the bottom convecting layer. Conventional heat exchange means may be employed. The heat exchange means may be either external wherein fluid from the solar canal is circulated through an external heat exchanger or may be internal wherein an isolated heat exchange fluid is circulated in a closed system through the bottom layer of the solar pond.

The solar canal of the present invention eliminates many of the problems of the prior art. It provides a means of collecting and storing solar energy which is not only easily and inexpensively constructed, maintained and operated but is also very durable. Such a device exhibits the multitude of advantages discussed above. Further, such a device increases the heat collection per unit of surface area over the prior art solar ponds.

These and other meritorious features and advantages of the present invention will be more fully appreciated from the following detailed description and claims.

BRIEF DESCRIPTION OF THE DRAWINGS

FIG. 2 is a cross-sectional view of a solar canal.

FIG. 4 is a graph relating depth of the solar pond to temperature of the fluid and density of the salt gradient.

DESCRIPTION OF THE PREFERRED EMBODIMENT

Figure 1:
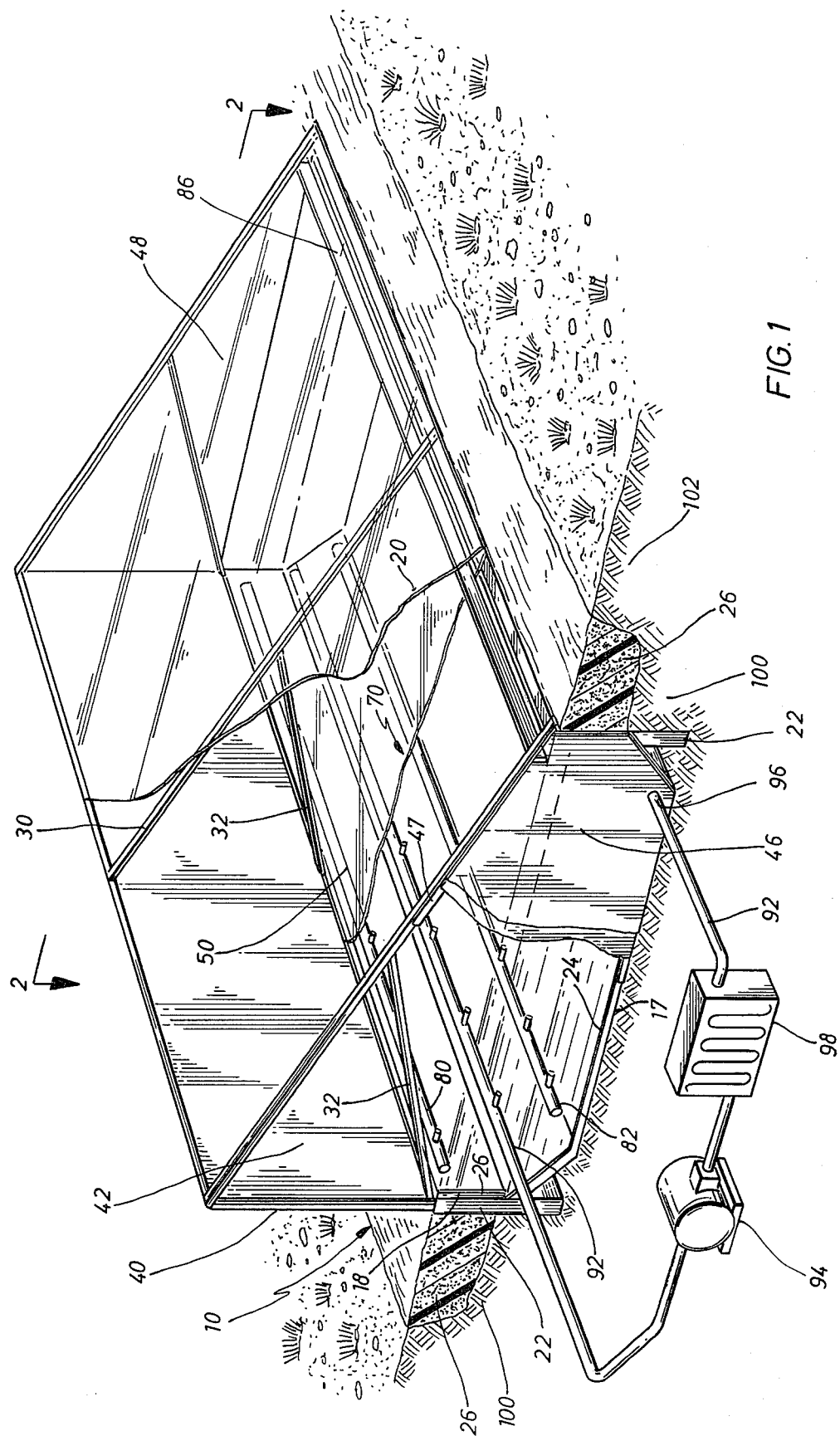
FIG. 1 is a perspective view of a solar canal.

The solar canal 10 of the present invention comprises a fluid filled collection and storage pond 15 and means for providing an essentially airtight environment for the fluid 60. This means is preferably cover plate 20. Solar pond 15 is preferably from about one to about three meters in depth and may be of any appropriate surface area. It is contemplated that such canals might be provided in arrays, wherein e.g., each individual canal might be approximately 20 feet in width by 100 feet or more in length, while the total array surface area is determined by the quantity of heated water required.

Smaller solar canals suitable for individual homes and small buildings may also be constructed in any appropriate size.

The canals may be excavated so that their entire depth is below the surface of the surrounding land 100 or may be elevated or partially elevated above such surface. One convenient construction means would provide for partial excavation of the canals with the fill 102 produced therefrom being placed between canals to provide additional height to buttress and insulate perimeter walls 22. Such perimeter walls 22 may be formed of concrete, stone, masonry, treated wood or any other appropriate material.

In the preferred embodiment pond 15 will also be provided with liner 24. Liner 24 may be formed of any appropriate waterproof material such as vinyl, concrete, ceramic tile, fiberglass, plastic or the like. A liner particularly favored for its versatility, durability and price is heavy vinyl, such as that used in vinyl swimming pools. Such a liner 24 will prevent leakage of the storage fluid from the solar canal. Preventing such leakage is important to maintenance of the solar canal and to the prevention of contamination of underground aquifers. Further, such a liner 24 when constructed of dark, absorbing material increases the insolation efficiency of the solar pond 15. Absorption of solar radiation incident upon such a liner indirectly adds to the heating and efficiency of the storage fluid 60.

An additional optional feature of the solar canal 10 is the use of perimeter insulation 26. Such insulation is not always required but will increase the efficiency of pond 15 by decreasing heat loss to the surrounding soil 100. Such perimeter insulation may optionally be placed along the bottom 17 and sides 18 of the solar pond 15. Any appropriate insulating material, such as styrofoam, fiberglass, vermiculite, cellulose or even peat, may be employed. The insulation 26 may be placed either interior or exterior of the perimeter walls 22. When placed interior to the walls and where the interior surface of the insulating material is waterproof and preferably dark, it may provide both the perimeter insulation 26 and the pond liner 24.

Cover plate 20 is preferably rigid. Rigid cover plate 20 is provided by a material which is transparent or translucent to solar radiation and preferably opaque to thermal infrared radiation. Plexiglass, fiberglass, glass or the like may provide such materials. Plexiglass or other plastics are preferred because of their light weight. Cover plate 20 may be self-supporting or may be supported on a rigid framework 30. Such a rigid framework 30 may be provided by aluminum, magnesium, steel, wood, plastic or any other appropriate support material. Such a cover plate 20 may lie flat across the top of pond 15, be elevated at one end as in FIGS. 1, 2 and 3a or be elevated at both ends as in FIG. 3b. Cover plate 20 and framework 30 form an essentially airtight seal with sides 18 of pond 15.

Rigid cover plate 20 is preferably elevated and supported on one side to provide optimum solar insolation. Support means may be provided by rigid support wall 40. Rigid support wall 40 should be placed upon the side of solar pond 15 which is farthest from the equator to provide maximum benefits. In the northern hemisphere rigid support wall 40 should be placed along the northern side of solar pond 15. Rigid support wall 40 may be constructed of any appropriate material, such as concrete, cinder block, masonry, stone, preserved wood or the like. An additional feature of rigid support wall 40 may be the inclusion of a reflective surface 42 on the side thereof which is adjacent to solar pond 15 and rigid cover plate 20. Such a reflective surface 42 may be provided by any appropriate means such as reflective paint, reflective foil or the like.

The preferred height of rigid support wall 40 varies with the geographical latitude of the solar canal 10 and the width thereof. Preferably the height of rigid support wall 40 should be such that the maximum solar insolation is provided to pond 15 during winter when the sun will be at its lowest point in the sky. Solar insolation decreases as the angle of the sun from normal with the surface of rigid cover plate 20 increases. The direct rays of the sun should make an angle of no more than about sixty degrees from normal with the surface of rigid cover plate 20. When the latitude (i.e. height of the sun in the sky) and width of the solar pond 15 are known, the ideal height of support wall 40 may be easily calculated.

When rigid cover plate 20 is supported on one side by rigid support wall 40 additional support struts 32 constructed from the same material as support frame 30 may also be employed to reduce the cost of the support frame. Walls 46, preferably with reflective interior surfaces 48 are required to cover the ends of this dead air space 50 when rigid support wall 40 is used. Walls 46 may be constructed of any appropriate material such as the same material as rigid support wall 40. Alternatively, walls 46 might comprise a transparent or translucent material. Rigid cover plate 20 and support frame 30 communicate with end walls 46 by any appropriate means to provide an essentially airtight construction. Such means may include rubber seals 47. With rigid cover plate 20 so supported, a dead air space 50 is provided. Such a dead air space 50 between rigid cover plate 20 and fluid 60 provides additional insulation. Rigid cover plate 20 and rigid support wall 40 together with sides 18 and end walls 46 form an essentially airtight environment over fluid 60.

Figure 3A:
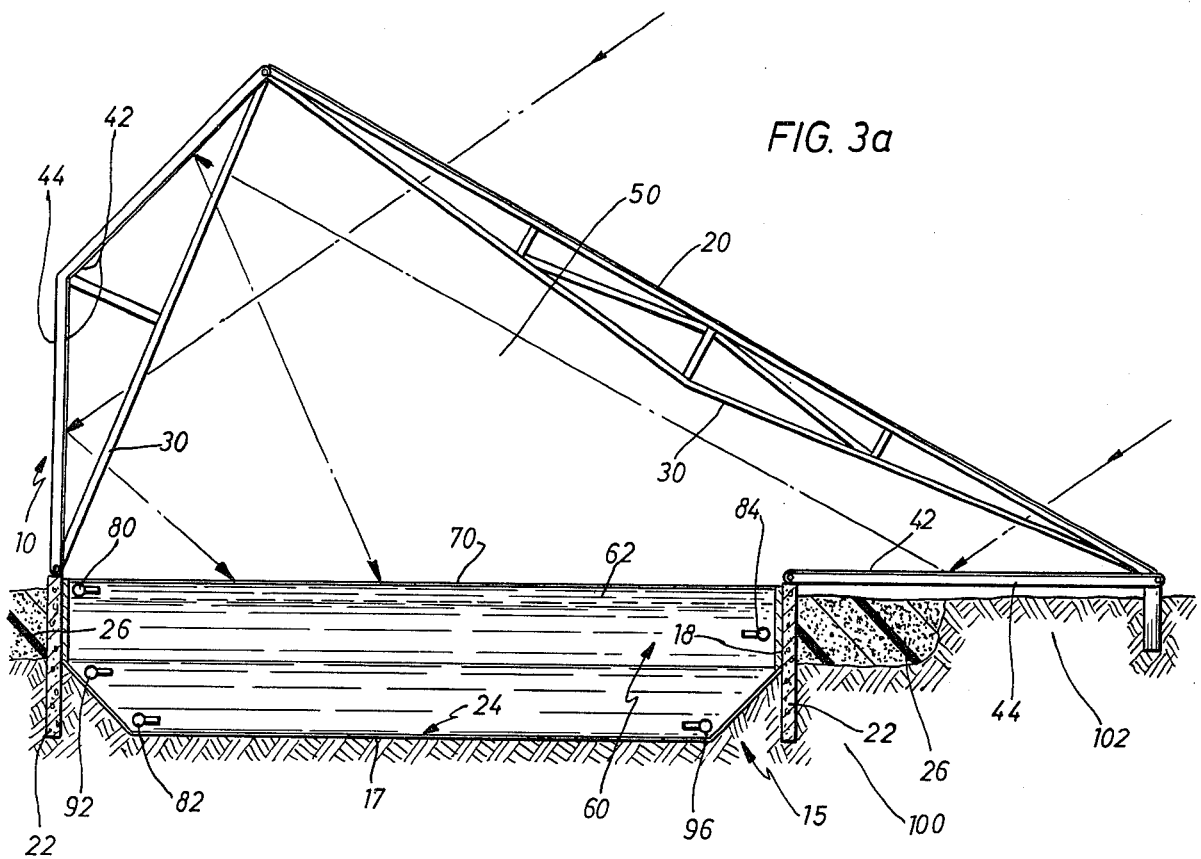
FIGS. 3a and 3b are cross-sectional views of a solar canal comprising a segmented and movable rigid cover plate and support wall system, illustrating respectively the winter and the summer position of the system.
Figure 3B:
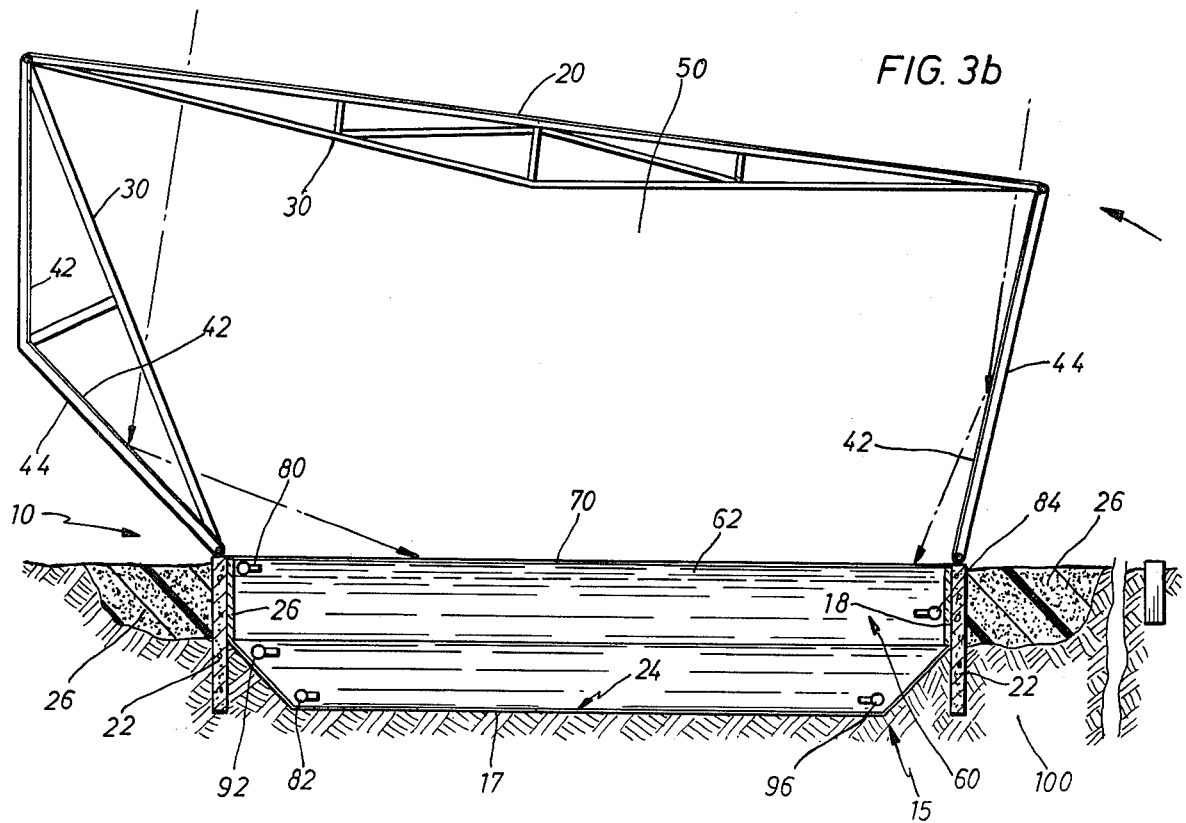

An alternative embodiment is shown in FIGS. 3a and 3b. In this embodiment, rigid cover plate 20 is attached pivotally on two opposite sides with movable support walls 44. Movable support walls 44 are in turn attached pivotally, in the example shown, to the upper ends of perimeter supports 22 and sides 18 of solar pond 15. The interior surfaces 42 of movable support walls 44 are preferably reflective. Such a system may be slowly moved during the year so that the maximum solar radiation passes through rigid cover plate 20 and is absorbed in fluid 60 during all seasons. Any appropriate conventional means of moving this cover system and holding it stationary in any given position may be used. FIG. 3a illustrates the position such a system would occupy in winter, while FIG. 3b illustrates its approximate position in summer.

Any appropriate fluid 60 which will absorb and store solar radiation may be used. Water, due to its abundance and relative cost is the preferred fluid. Where relatively pure water or other fluid 60 is employed, a convecting solar pond is produced.

The preferred embodiment of the present invention employs a non-convecting solar pond 15. Such a pond contains a fluid 60 comprising several layers. A convecting upper layer 62 is provided. This layer is directly below the surface of fluid 60 and may extend for a depth of approximately 0.1 to 0.2 meters. A convecting bottom layer 66 is also provided. Convecting bottom layer 66 is located at the bottom of solar pond 15 and may be approximately 0.5 to 2 meters in depth. The depth of bottom convecting layer 66 is proportional to the heat storage requirement for the solar canal. Additional storage capacity is provided by making bottom convecting layer 66 deeper to increase its volume. Between these two convecting layers is found a non-convecting central layer 64. Such non-convecting layer 64 may be approximately 0.5 to 1.5 meters in depth. U.S. Pat. No. 4,138,992 discloses means to calculate the theoretical depth and density gradient needed to inhibit convection under various conditions and is incorporated by reference herein. However, in most cases a satisfactory non-convecting layer may be obtained without using these calculations to produce the most efficient solar pond. Various means exist to produce these three basic layers. For example, gel or other thickening agents may be used to increase the viscosity of fluid 60 to produce a non-convecting layer. Membranes attached in solar pond 15 either horizontally or vertically may also be used to produce such a non-convecting layer.

In the preferred embodiment of the present invention such layers are produced by the use of a salt gradient concentration layer. In this embodiment the upper convecting layer 62 is provided by a pure fluid or a fluid wherein the concentration of salt is relatively low. The lower convecting layer 66 is provided by a highly concentrated salt solution. The central non-convecting layer 64 is provided by a gradient salt solution wherein the concentration of salt increases with depth. Such a solution is characterized by increasing density and concentration with depth which counteracts the decreasing thermal density with depth and temperature thus producing a non-convecting layer. Any appropriate salt, such as the alkali and alkaline earth metal halides and carbonates, may be used. Examples of such salts include sodium chloride, magnesium chloride, calcium chloride and sodium bicarbonate. The preferred salt is presently believed to be sodium chloride due to its abundance and relatively inexpensive cost.

Alternatively, a saturated saline pond 15 may be produced. In such a saturated saline pond, the fluid 60 is saturated with the given salt at all depths. Any appropriate salt which exhibits a significant increase in solubility with increased temperature may be used to produce such salt gradients. When a salt such as magnesium chloride whose solubility increases dramatically with temperature is used, the salt concentration will increase with depth (temperature), producing a solar pond 15 wherein saturated fluid 60 exhibits a saline concentration gradient with depth. The preferred salt is presently believed to be magnesium chloride.

The graph of FIG. 4 illustrates a representative relationship between the depth of pond 15 and the temperature and density of fluid 60 therein.

An additional feature of the solar canal of the present invention is the use of a covering material 70 placed between the rigid cover plate 20 and the fluid 60 filling pond 15. Such covering material 70 is preferably placed in contact with the surface of fluid 60 and attached to sides 18 to essentially isolate fluid 60 from dead air space 50. Covering material 70 may be produced from any appropriate material, such as plastic or polyethylene. Such material is preferably relatively thin, e.g., one to three mils thick.

Means of maintaining the salt gradient in solar pond 15 may also be provided. Such means may take the form of injectors 80 placed at appropriate distances along the length of solar pond 15 and near the surface thereof to inject small quantities of pure fluid or fluid containing minimal salt concentration into solar pond 15. A similar set of injectors 82 would be placed near the bottom of pond 15 to inject highly concentrated or saturated salt solutions therein. Appropriate extracters 84 would be placed near the midpoint of the non-convecting salt gradient layer 64 to extract a volume of fluid therefrom which would be approximately equal to the volumes injected at injectors 80 and 82. Such a system would maintain the total fluid volume while also maintaining the salt gradient of layer 64. Any appropriate conventional pumping, piping and nozzle system known in the art may be used to provide this means of maintaining fluid volume and salt gradient concentrations.

An alternative means of maintaining the salt gradient, particularly in a salt gradient pond, employs the natural evaporation of the surface water and its condensation on the lower side of rigid cover plate 20 which is supported on one side by support wall 40. The condensed water will naturally flow down the lower side of rigid cover plate 20 and will re-enter the surface layer 62 at drip ledge 86. This provides an ideal passive system to automatically maintain the salt gradient in enclosed, isolated, saturated ponds. It may also be used effectively in enclosed, isolated fresh water ponds of this construction.

Any appropriate heat exchange means may be provided to extract heat from the bottom convecting layer 66. For example, in the preferred embodiment perforated extraction pipes 92 are located in solar pond 15 near the top of bottom convecting layer 66. Suitable pumps 94 withdraw heated fluid 66 from pond 15. Such fluid is passed through external heat exchanger 99 to extract stored heat therefrom. The fluid is then returned via perforated pipe 96 near the bottom of bottom convecting liquid 66. Such an arrangement withdraws fluid from the hottest zone of bottom convecting layer 66 and returns it to the coolest zone.

Alternatively, an isolated fluid could be pumped through heat exchange means located in bottom convecting layer 66 and then through other external heat exchange means to extract heat from solar canal 10.

While the above has illustrated what is now contemplated to be the best mode of carrying out the invention, the solar canal of the present invention is subject to modification without departing from the spirit and scope of the invention. For example, many means of providing a non-convecting layer or of extracting heat from the solar canal may be employed. Therefore, the invention is not restricted to the particular form of construction illustrated and described, but covers all modifications which may fall within the scope of the following claims. It is applicant's intention in the following claims to cover such modifications and variations as fall within the true spirit and scope of the invention.

What is claimed is:

1. A solar canal for the collection and storage of solar energy comprising:
   (a) a fluid filled collection and storage pond wherein the bottom and sides of said pond are constructed of a dark, absorbing material and are optionally comprised of an insulating material and wherein the fluid contains at least one salt whose concentration is graduated so that the highest concentration is near the bottom and the lowest concentration is near the surface to produce convecting layers at the top and bottom of said pond and a non-convecting layer between said convecting layers;

(b) a thin film attached to the walls of said pond and in contact with the surface of said fluid, and a rigid cover plate over said pond wherein said film and said rigid cover plate are in communication with the sides of said solar pond so as to retain the fluid in an essentially airtight environment and are transparent or translucent to solar radiation and optionally opaque to thermal infrared radiation; and (c) a rigid support wall located on the side of said pond farthest from the equator, said rigid support wall supporting said rigid cover plate at an angle to the surface of said pond and being reflective on its side adjacent said pond and rigid cover plate.

2. The solar canal of claim 1, further comprising means for extracting heat from said convecting layer near the bottom of said pond.

3. The solar canal of claim 2, wherein said means for extracting heat comprises a means of extracting fluid from near the top of said bottom convecting layer of said pond and conveying said extracted fluid to a heat exchange means external to said pond, and a means for reconveying said fluid from said external heat exchange means and releasing said fluid in said bottom convecting layer of said pond near the bottom thereof.

* * * * *